(12) United States Patent
Sora

(10) Patent No.: US 9,437,845 B2
(45) Date of Patent: Sep. 6, 2016

(54) BATTERY MODULE AND BATTERY PACK

(71) Applicant: NISSAN MOTOR CO., LTD., Yokohama-shi, Kanagawa (JP)

(72) Inventor: Yosuke Sora, Yokohama (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/653,101

(22) PCT Filed: Dec. 10, 2013

(86) PCT No.: PCT/JP2013/083131
§ 371 (c)(1),
(2) Date: Jun. 17, 2015

(87) PCT Pub. No.: WO2014/103709
PCT Pub. Date: Jul. 3, 2014

(65) Prior Publication Data
US 2015/0372260 A1 Dec. 24, 2015

(30) Foreign Application Priority Data

Dec. 27, 2012 (JP) ................................. 2012-285107

(51) Int. Cl.
*H01M 10/052* (2010.01)
*H01M 2/02* (2006.01)
*H01M 2/10* (2006.01)

(52) U.S. Cl.
CPC ........... *H01M 2/024* (2013.01); *H01M 2/1061* (2013.01); *H01M 2/1077* (2013.01); *H01M 2/021* (2013.01); *H01M 2/0212* (2013.01); *H01M 2220/20* (2013.01)

(58) Field of Classification Search
CPC .......................... H01M 2/1077; H01M 2/206
See application file for complete search history.

(56) References Cited

U.S. PATENT DOCUMENTS

| 4,091,187 A | 5/1978 | Kaye | |
|---|---|---|---|
| 2011/0014512 A1* | 1/2011 | Amagai | H01M 2/0217 429/159 |

FOREIGN PATENT DOCUMENTS

| EP | 2355201 A1 | 8/2011 |
|---|---|---|
| JP | 5092420 A | 7/1975 |
| JP | 05121056 A | 5/1993 |
| JP | 2003059471 A | 2/2003 |
| JP | 2003203615 A | 7/2003 |
| JP | 2006156090 A | 6/2006 |
| JP | 2009-231267 A | 10/2009 |
| JP | 2012164545 A | 8/2012 |
| WO | 2010131780 A1 | 11/2010 |

\* cited by examiner

*Primary Examiner* — Stewart Fraser
*Assistant Examiner* — Olatunji Godo
(74) *Attorney, Agent, or Firm* — Young Basile Hanlon & MacFarlane, P.C.

(57) ABSTRACT

To provide a battery module that may be easily assembled, and is capable of preventing a cell unit from being damaged during assembly, the battery module includes a cell unit provided with at least one unit cell, and first and second cases which enclose and accommodate the cell unit. The first and second cases are respectively provided with a main surface, and a side surface which is bent at one end of the main surface and extends in a direction away from the main surface.

4 Claims, 13 Drawing Sheets

BATTERY MODULE AND BATTERY PACK

CROSS REFERENCE TO RELATED APPLICATION

The present application claims priority to Japanese Patent Application No. 2012-285107, filed Dec. 27, 2012, incorporated herein in its entirety.

TECHNICAL FIELD

The present invention relates to a battery module and a battery pack.

BACKGROUND

In recent years, in the field of automobile industry and advanced electronic industry, the demand for secondary batteries such as automobile batteries and electronic devices is increasing. In these secondary batteries, an exterior or outer member made of a flexibly deformable laminate sheet seals a unit cell which is a battery element. Furthermore, a battery module is structured by enclosing a cell unit including a laminate of several such unit cells stacked on one another by upper and lower cases. Moreover, by connecting multiple battery modules configured in this way in series or in parallel, a battery pack is formed, which corresponds to a desired current, voltage, or capacity (for example, see JP 2003-203615 JP).

In the secondary battery described in JP 2003-203615 JP, however, since the height of a pair of side surfaces of the upper and lower covers are the same, when accommodating the cell unit in the lower cover at the time of assembly, or when covering the cell unit with a top cover, it is necessary to adjust the battery module, the upper cover, or the lower cover to find a position for proper fitting. Therefore, it takes a long time for assembly. Also, there is a concern that the cell unit is damaged due to interference to of the cell unit with the side surface.

SUMMARY

The present invention has been made to solve the above problem, and an object thereof is to provide a battery module and a battery pack which may be easily assembled and may be prevented from being damaged when assembling.

In order to achieve the above object, a battery module according to the present invention comprises a cell unit having at least one unit cell, and first and second cases, which are paired to enclose and house the cell unit. Each of the first and second cases has a main surface and either one side surface bent at one end of and extending in a direction away from the main surface or a pair of side surfaces bent at both ends of and extending in a direction away from the main surface with different extension lengths from each other. Each of the main surfaces of the first case and the second case is formed with a first through hole in the extension direction of the side surface, the battery module further comprising: a spacer, provided with the cell unit, which is fixed to the end of the unit cell and formed with a second through hole in the extension direction of the side surface in the extension direction, and a fastener inserted into the first through hole and the second through hole to thereby fasten the first case, the cell unit, and the second case.

In the battery module constructed as above, the cell unit is relatively moved to the first case until abutting against a side surface bent at and extending from one end of the main surface or a side surface with longer extension length of the pair of side surfaces, in a direction perpendicular to the surface(s). Then, the cell unit is relatively moved to the first case in a direction of extension of the side surface by using the side surface as a guide until abutting against the side surface bent at and extending from one end of the main surface or the side surface with longer extension length of the pair of side surfaces. Then, by moving the cell unit relatively to the second case in a direction of extension of the side surface using the side surface as a guide, the cell unit may be covered by the second case. Therefore, it is possible to provide a battery module which may be easily assembled and is capable of being prevented from damage during assembly process.

DETAILED DESCRIPTION OF THE EMBODIMENTS

<First Embodiment>

Figure 1:
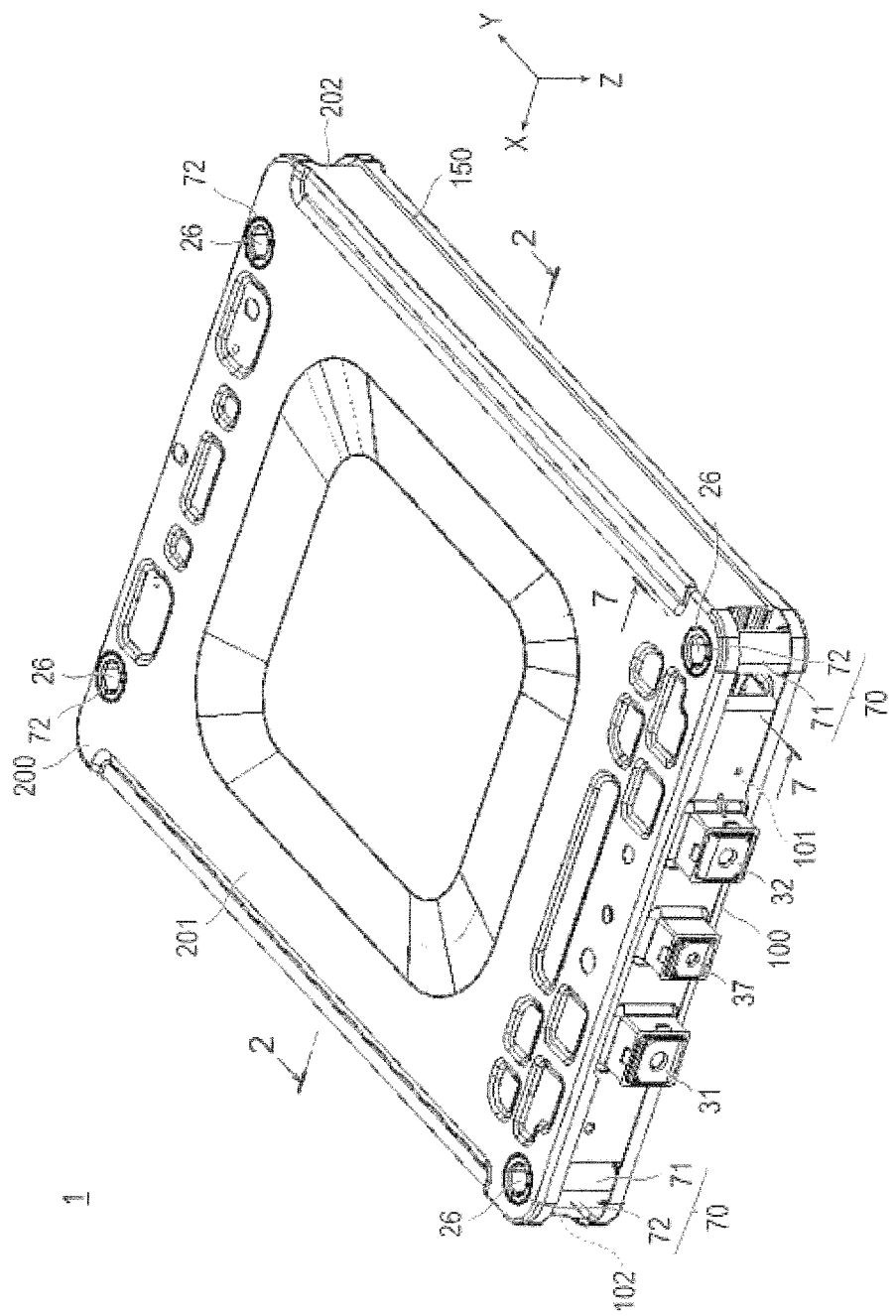
FIG. 1 is a perspective view showing a battery module pertaining to a first embodiment according to the present invention.

Below, with reference to the accompanying drawings, a description will be given of a first embodiment according to the present invention. The same element is attached with the same reference numeral in the description of the drawings, and duplicate description will be omitted. Dimensional ratios of the drawings are exaggerated for convenience of explanation and may be different from the actual ratio. First, a description is given of the configuration of a battery module.

Figure 2:
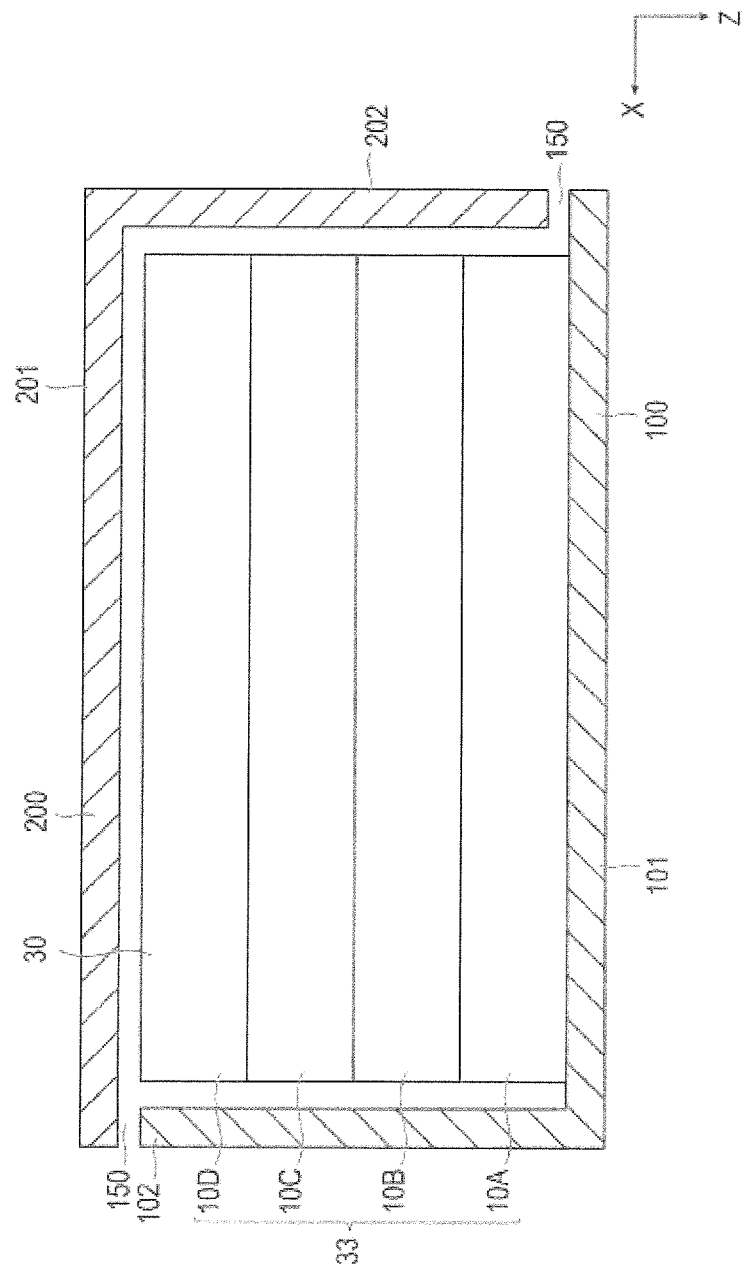
FIG. 2 is a schematic sectional view taken along line 2-2 in FIG. 2.
Figure 3:
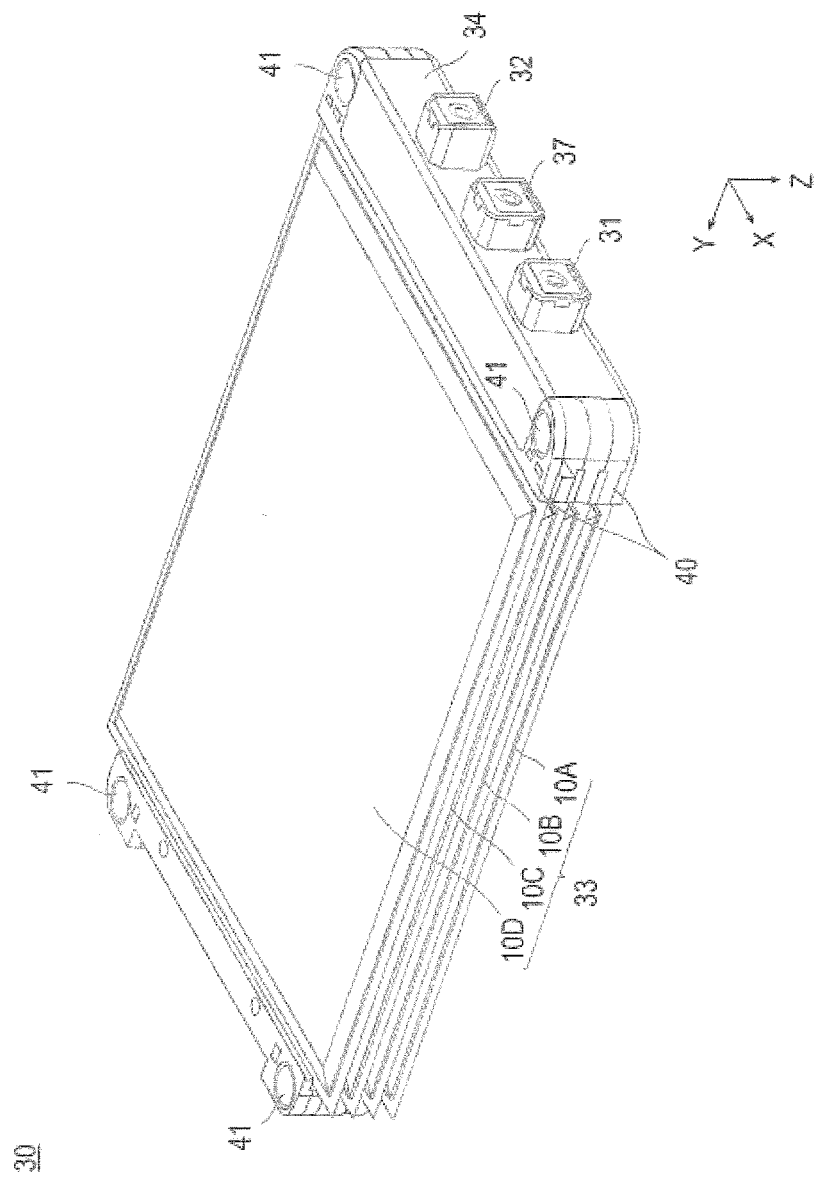
FIG. 3 is a perspective view of a cell unit of the battery module.

FIG. 1 is a perspective view of a battery module 1 pertaining to a first embodiment of the present invention. FIG. 2 is a schematic sectional view taken along line 2-2 of FIG. 1. In FIG. 2, for simplicity of description, a cell unit 30 is described by a block body. FIG. 3 is a perspective view of a cell unit 30 of the battery module 1. Further, the schematic sectional views shown in FIGS. 8 to 16 below, are those similar to FIG. 2 taken along line 2-2 of FIG. 1.

A battery module 1 pertaining to the first embodiment according to the present invention is generally shown in FIGS. 1-3, and is provided with a cell unit 30 with four cells 10 (10A to 10D), and first and second cases 100, 200 which are paired to enclose the cell unit 30. Each of the first and second cases 100, 200 includes a main surface 101, 201 and a side surface 102, 103 bent at one end of the main surface 101, 201 and extending in a direction away from the main surface 101, 201. Below, a description is given in detail.

The battery module 1 includes a cell unit 30 having four unit cells 10 (10A-10D), and a pair of the first and second cases 100, 200 for accommodating or housing the cell unit 30 so as to enclose the cell unit. The battery module 1 is further provided with, in the main surface 101, 201 of the first and second cases 100, 200, a first through hole 26 extending in an extension direction Z of the side surfaces 102, 202 and a fastening mechanism 70 which is inserted into a second through hole 41 provided in the extension direction Z in a spacer 40 described below. The fastening mechanism 70 in intended to fasten the first case 100, the cell unit 30, and the second case 200 together.

As shown in FIG. 3, the cell unit 30 includes a stacked laminate 33 with four unit cells 10 (10A to 10D) stacked on one another and electrically connected to each other, an external output terminal 31, 32, and a voltage detection terminal 37. Note that the laminate 33 is configured by four unit cells 10 (10A to 10D). However, it is sufficient that at least one unit cell is provided. The external output terminal 31, 32 is composed form an external output positive electrode terminal 31 and an external output negative electrode terminal 32.

Figure 4:
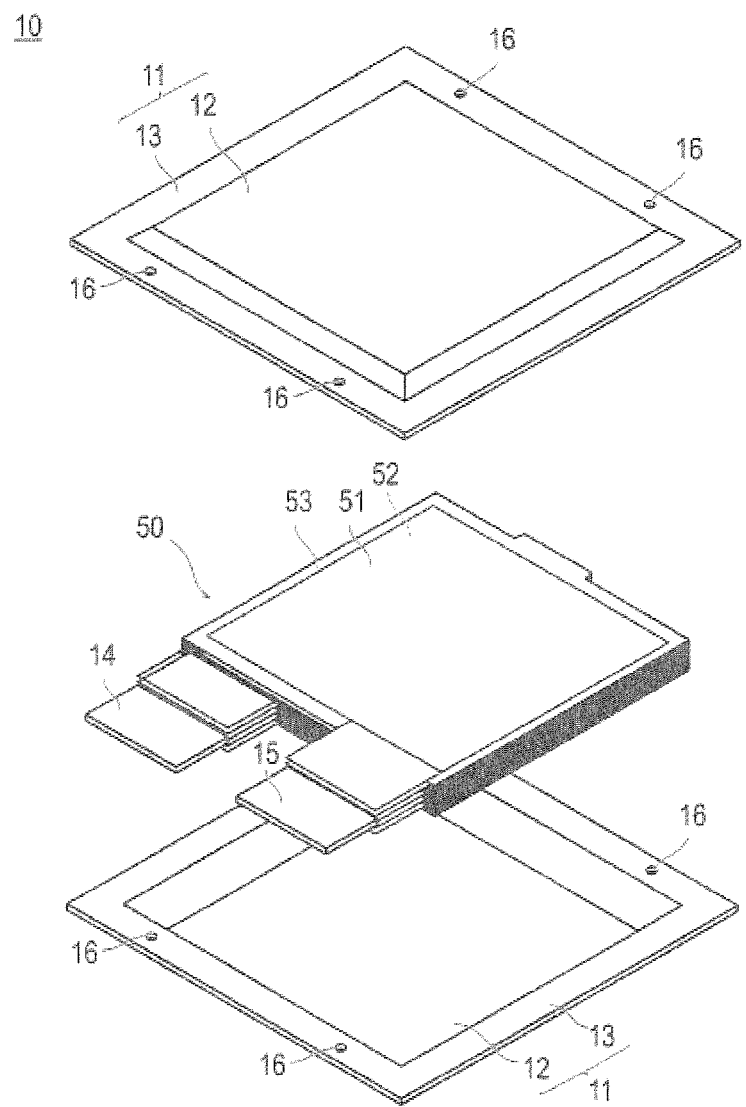
FIG. 4 is an exploded perspective view showing the internal structure of the unit cell of the battery module.

FIG. 4 is an exploded perspective view showing the internal structure of the unit cell 10 of the battery module 1.

As shown in FIG. 4, the unit cell is for example a lithium ion secondary battery in which a laminate electrode body 50 is accommodated together with an electrolyte in an outer member 11 arranged on both sides of the laminate electrode body 50. The unit cell 10 has a positive electrode tab 14 and a negative electrode tab 15 derived from the outer member 11 to the outside.

The laminated electrode body 50 is an electrode group formed by laminating or stacking alternately a positive electrode 51, a separator 53, and a negative electrode 52. The positive electrode 51 includes a positive electrode active material layer composed of a transition metal complex oxide, for example, $LiMn_2O_4$. The negative electrode 52 includes a negative electrode active material layer composed of a carbon and lithium-transition metal complex oxide. The separator 53 is formed, for example, from porous PE (polyethylene) having air permeability that can penetrate the electrolyte.

The outer or package member 11 is formed, from the viewpoint of weight reduction and thermal conductivity, of a sheet member such as a polymer-metal composite laminate film in which a metal such as aluminum, stainless steel, nickel, copper, etc. (including alloys) is coated with an insulator such as a polypropylene film. The outer member 11 has a main portion 12 covering the laminated electrode body 50 and a periphery portion 13 extending to the periphery of the body portion 12 with a part or the entire periphery portion 13 joined by hot-melt or heat fusion.

The positive electrode tab 14 and the negative electrode tab 15 are intended to serve a member for drawing current from the stacked electrode body 50 and extended to one side of the unit cell 10.

Figure 5:
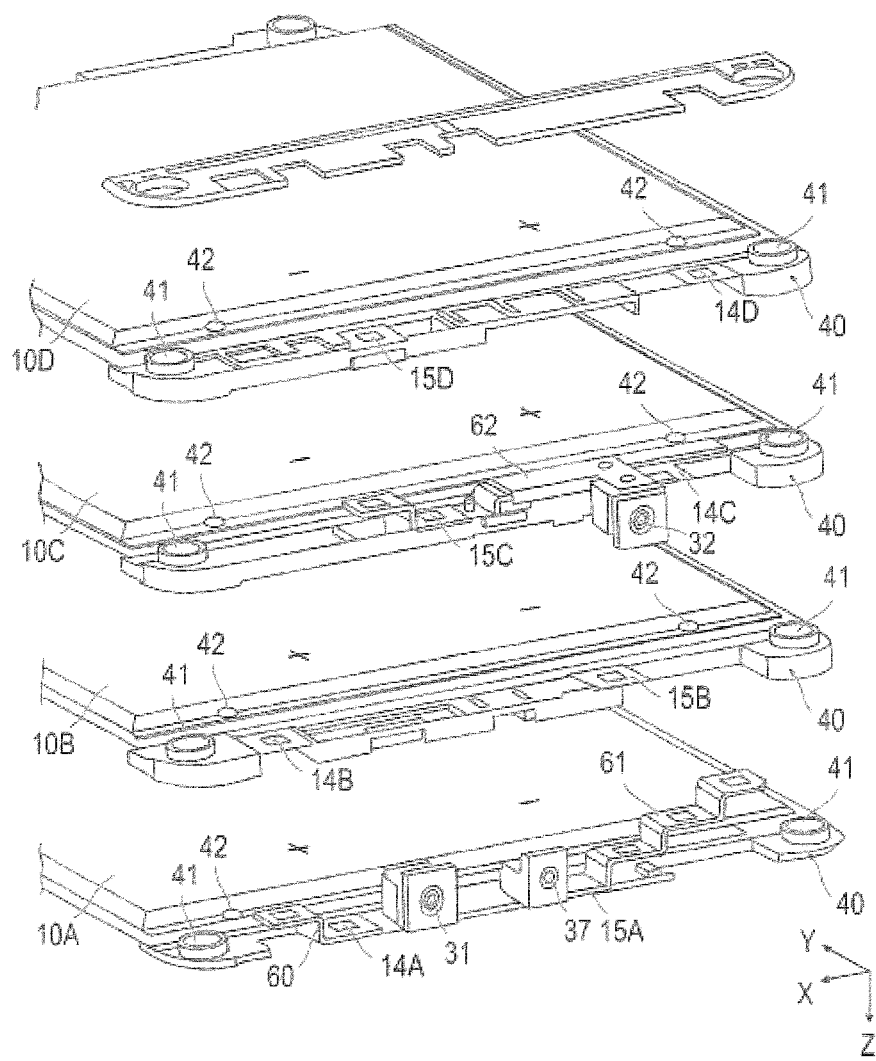
FIG. 5 is an exploded perspective view showing the internal structure of the cell unit of the battery module.

FIG. 5 is an exploded perspective view showing the internal structure of the cell unit 30 of the battery module 1.

As shown in FIG. 5, the spacer 40, has a second through hole 41 at both ends in the longitudinal direction X. The second through hole 41 is aligned with the first through hole 26 of the first case 100 and second case 200, and is used for having a sleeve 71 inserted. For the spacer 40, use is made of an electrically insulating resin material.

In addition, the positive electrode tab 14A of the first unit cell 10A and the positive electrode tab 14B of the second unit cell 10B are joined by ultrasonic welding or the like to a bus bar 60 which is connected to the external output positive terminal 31. On the other hand, the negative electrode tab 15A of the first unit cell 10A and the negative electrode tab 15B of the second unit cell 10B are connected, jointly with the positive electrode tabs 14C, 14D of the third and fourth unit cells 10C, 10D, to a bus bar 61 by ultrasonic welding or the like, which in turn is electrically connected to the voltage detection terminal 37. Further, the negative electrode tab 15C of the third unit cell 10C and the negative electrode tab 15D of the fourth unit cell 10D are connected to a bus bar 62 by ultrasonic welding or the like, which is electrically connected to the external output negative terminal 32.

Figure 6:
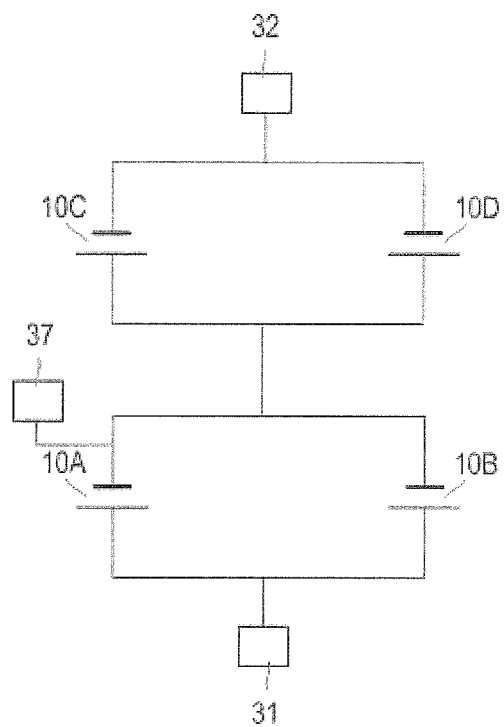
FIG. 6 is a diagram showing an electrical connection of a plurality of unit cells constituting the battery module.

As described above, each of the electrode tabs 14A to 14D, 15A to 15D of the unit cells 10A to 10D are connected via the bus bar 60, 61, 62 to the external output positive electrode terminal 31, the external output negative electrode terminal 32, and the voltage detection terminal 37, respectively. Thus, as shown in FIG. 6, these unit cells 10A to 10D are configured to form a two parallel two series connection.

The voltage detection terminal 37 is provided to detect the voltage of the battery cell 10A to 10D constituting the battery module 1. Specifically, by using the external output positive terminal 31 and the voltage detection terminal 37 and measuring the voltage between these terminals, the voltage of the first battery cell 10A and that of the second battery cell 10B can be detected. Also, the voltage of the third unit cell 10C and that of the fourth unit cell 10D can be detected by using the external output negative terminal 32 and the voltage detection terminal 37 and measuring the voltage between these terminals.

As shown in FIG. 2, the first case 100 and the second case 200 are respectively provided with a main surface 101, 201 on which the cell unit is mounted, and a side surface 102, 202 bend at one end of the main surface 101, 201 and extending in the extension direction Z. The first case 100 and second case 200 are of the same shape. The first case 100 and second case 200 are arranged to be staggered and are opposed to each other at two mating portions 150, 150. The main surface 101, 201 has four first through holes 26 penetrating in the extension direction Z. The material of the first case 100 and second case 200 is preferably a material having a higher melting point than the heat flow temperature (700 to 1000° C. above) ejected when the battery module 1 is damaged, such as steel and the like.

Figure 7:
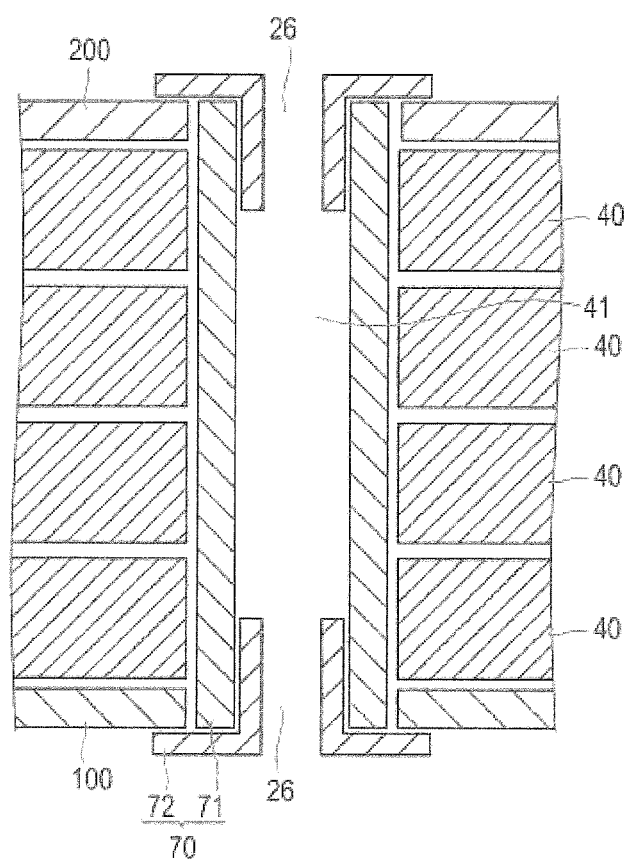
FIG. 7 is a sectional view taken along line 7-7 of FIG. 1.

FIG. 7 is a sectional view taken along line 7-7 of FIG. 1. As shown in FIG. 7, the fastening mechanism or fastener 70 is inserted into the first through hole 26 and the second through hole 41 for fastening the first case 100, the cell unit 30, and the second case 200. The fastener 70 includes a sleeve 71 which is inserted into the first through hole 26 and the second through hole 41, a press-fit collar 72 for fastening the first case 100, the cell unit 30, and the second case 200 by being pressed from above and below the sleeve 71. Note that, in the present embodiment, the fastener 70 includes the sleeve 71 and the press-fit collar 72. However, the structure is not limited thereto as long as the first case 100, the cell unit 30, and the second case 200 can be fastened.

Referring now to FIG. 8, a description is given of a method for assembling the battery module 1 in the first embodiment according to the present invention.

Figure 8A:
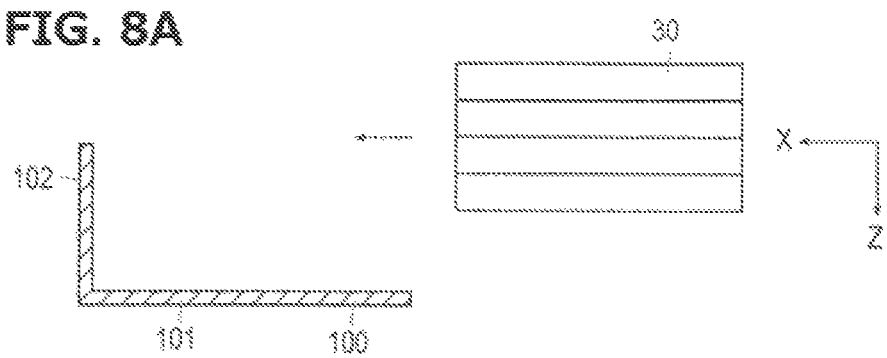
FIG. 8 is a schematic cross-sectional view illustrating a method of assembling a battery module in the first embodiment.
Figure 8B:
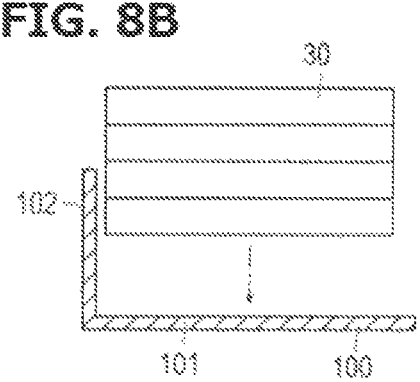
Figure 8E:
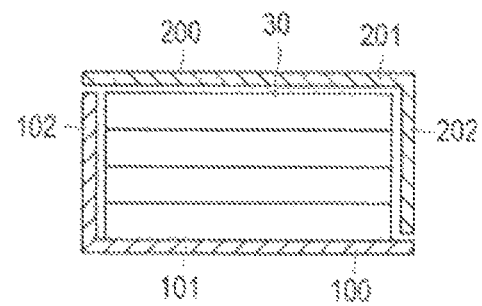
Figure 8C:
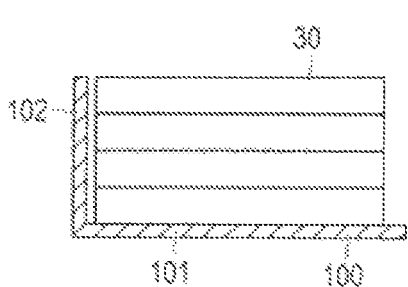
Figure 8D:
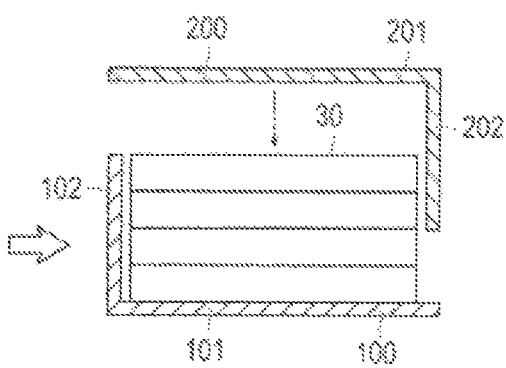

First, the cell unit 30 is placed on the upper right of the first case 100 in the XZ plane (see FIG. 8A). Then, the cell unit 30 is moved leftward in the X-direction until the cell unit 30 contacts or abuts against the side surface 102 of the first case 100 (see FIG. 8B). Then, by using the side surface 102 as a guide, the cell unit 30 is moved downward in the Z-direction until the cell unit 30 contacts the main surface 101 of the first case 100 (FIG. 8C). Then, the second case 200 is placed on right above the cell unit 30 in the XZ plane, and is moved leftward in the X-direction until abutting against the side surface 202 of the second case 200 (see FIG. 8D). Finally, by using the side surface 202 as a guide, the second case 200 is moved downward in the Z-direction until contacting the main surface 201 of the second case 200 (see FIG. 8E).

Due to the above steps, the battery module 1 pertaining to the first embodiment according to the present invention is assembled. Note that, in the present embodiment, the cell unit 30 is moved toward the first case 100, and the second case is moved toward the cell unit 30 to assemble the battery module 1. However, the battery module 1 may be assembled by moving the first case 100 toward the cell unit 30, and by moving the cell unit 30 and the first case 100 toward the second case 200, as well.

As described above, the battery module 1 pertaining to the first embodiment according to the present invention, includes a cell unit 30 comprising four unit cells 10 (10A to 10D), a pair of first case 100 and second case 200 to enclose and accommodate the cell unit 30. The first case 100 and the second case 200 are respectively provided with a main surface 101, 201 and a side surface 102, 2012 bent at one end of the main surface 101, 201 and extending in a direction away from the main surface 101, 201. Thus, by moving the cell unit 30 in a X-direction relative to the first case 100 until abutting against the side surface 102 thereof, and by moving the cell unit 30 in Z-direction relatively using the side surface 102 as a guide, the cell unit 30 may be accommodated in the first case 100. Further, by moving the second case 200 in X-direction relatively until abutting against the side surface 202 of the second case 200, and by moving the second case 200 in Z-direction relatively using the side surface 202 as a guide, the cell unit 30 may be covered by the second case 200. Thus, such a battery module 1 may be provided in which the assembly is easy and the cell unit 30 may be prevented from being damaged at the time of assembly. Further, when forming the first case 100 and second case 200 by press molding, it is possible to reduce the number of forming to thereby shorten the manufacturing time.

In addition, the first case 100 and second case 200 are of the same shape. Therefore, it is possible to reduce the number of components while reducing the cost.

Also, each of the main surfaces 101, 201 of the first case 100 and second case 200 is formed with the first through hole 26 in the Z direction. The cell unit 30 is provided with a spacer 40 which is fixed to the end of the unit cell 10 and the second through hole 41 in the Z direction. Further, the battery module 1 also includes a fastening mechanism or fastener 70 which is inserted into the first through hole 26 and the second through hole 41 to thereby fasten the first case 100, the cell unit 30, and the second case 200. Therefore, by the fastener 70, it is possible to easily position the first casing 100, cell unit 30 and the second case 200.

<Second Embodiment>

Now, a description is given of a second embodiment according to the present invention. Parts common to the first embodiment will be omitted, and a description is given only of the portion featuring the second embodiment.

Figure 9:
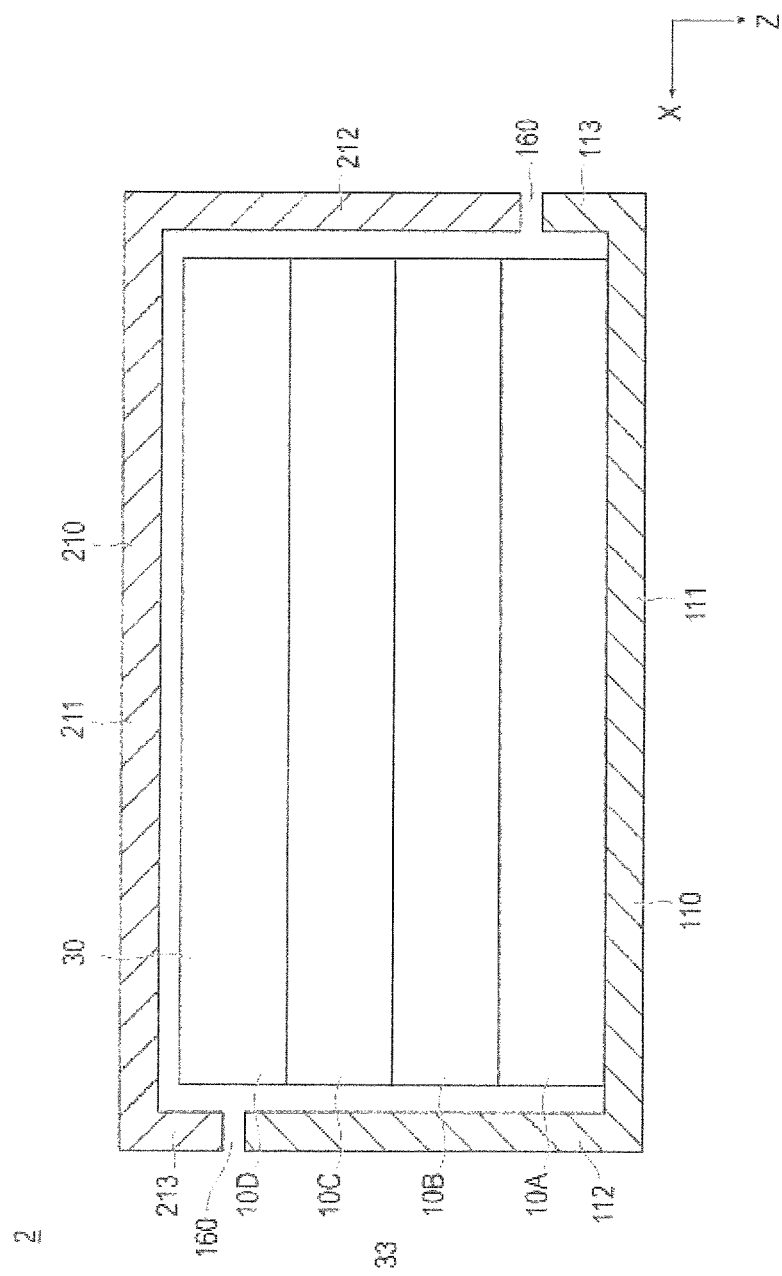
FIG. 9 is a schematic sectional view showing a battery module pertaining to a second embodiment according to the present invention.

FIG. 9 is a schematic cross-sectional view showing a battery module 2 pertaining to a second embodiment according to the present invention.

As shown in FIG. 9, a cell module 2 pertaining to a second embodiment according to the present invention is generally provided with a cell unit having four unit cells 10 (10A to 10D), and a pair of a first and second cases 110, 210 which enclose to accommodate the cell unit 30. The first case 110 and the second case 210 are respectively provided with a main surface 111, 211, and a pair of side surfaces 112, 113; 212, 213, which are bent on both ends of the main surface 111, 211 and extending in a direction away from the main surface 111, 211 and having different extension length from each other. Below, a description is given in detail.

The first case 110 includes a main surface 111 and a pair of side surfaces 112, 113 which are bent on both ends of the main surface 11 and extending with different lengths in a direction away from the main surface 111. The side surface 112 is formed longer in the extension length than the side surface 113.

The second case 210 includes a main surface 211 and a pair of side surfaces 212, 213 which are bent at both ends of the main surface 211 and extending with different lengths from each other and in a direction away from the main surface 211. The extension length of the side surface 212 is longer than the side surface 213.

The first case 110 and second case 210 are arranged to be staggered, and opposed to each other with a gap at two mating portions 160, 160.

Referring now to FIG. 10, a description is given of a method for assembling the cell module 2 pertaining to the second embodiment according to the present invention.

Figure 10A:
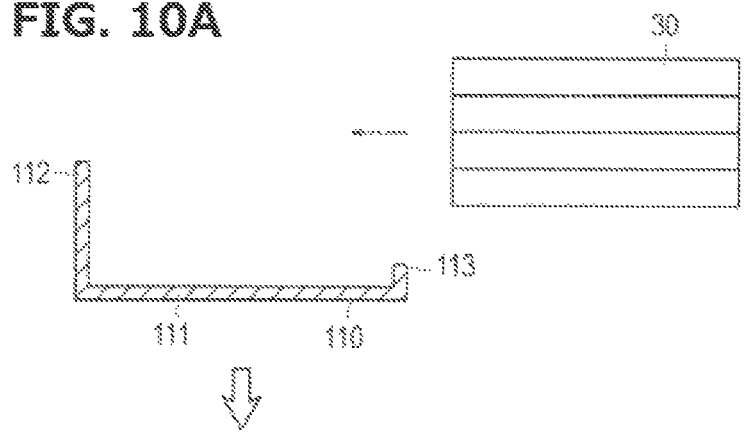
FIG. 10 is a schematic cross-sectional view illustrating a method of assembling a battery module in the second embodiment.
Figure 10B:
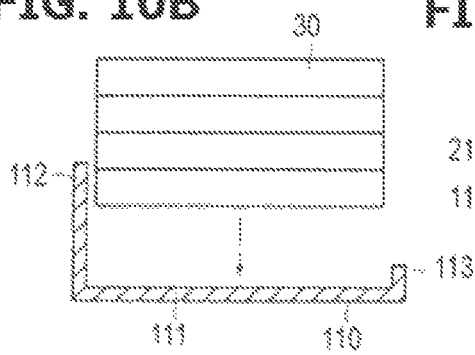
Figure 10E:
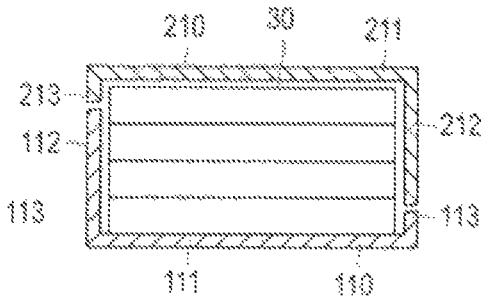
Figure 10C:
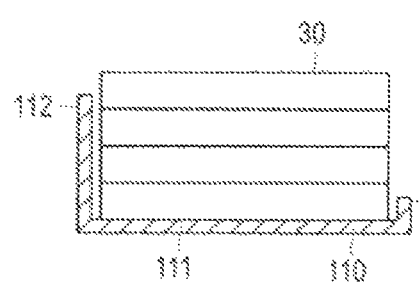
Figure 10D:
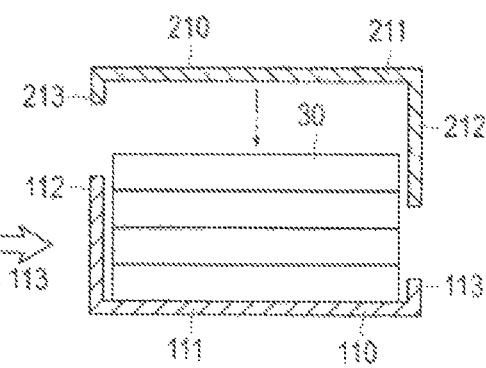

First, the cell units 30 is placed on the upper right of the first case 110 in the XZ plane (see FIG. 10A). Then, the cell unit 30 is moved leftward in the X-direction without interfering the side surface 113 until the cell unit 30 contacts or abuts against the side surface 112 of the first case 110 (see FIG. 10B). Then, by using the side surface 112 as a guide, the cell unit 30 is moved downward in the Z-direction until the cell unit 30 contacts the main surface 111 of the first case 110 (FIG. 10C). Then, the second case 210 is placed on right above the cell unit 30 in the XZ plane, and is moved leftward in the X-direction without interfering the side member 213 until abutting against the side surface 212 of the second case 210 (see FIG. 10D). Finally, by using the side surface 212 as a guide, the second case 210 is moved downward in the Z-direction until contacting the main surface 211 of the second case 210 (see FIG. 10E).

By the steps described above, the battery module 2 pertaining to the second embodiment according to the present invention is assembled.

As described above, the battery module 1 pertaining to the second embodiment according to the present invention, includes a cell unit 30 comprising four unit cells 10 (10A~10D), a pair of first case 110 and second case 210 to enclose so as to accommodate the cell unit 30. The first case 110 and the second case 210 are respectively provided with a main surface 111, 211 and a side surface 112, 212 bent at both ends of the main surface 111, 211 and extending with different lengths each other in a direction away from the main surface 111, 211. Thus, by moving the cell unit 30 in a X-direction relative to the first case 110 until abutting against the side surface 112 thereof, and by moving the cell unit 30 in Z-direction relatively using the side surface 112 as a guide, the cell unit 30 may be accommodated in the first case 110. Further, by moving the second case 210 in X-direction relatively until abutting against the side surface 212 of the second case 210, and by moving the second case 210 in Z-direction relatively using the side surface 212 as a guide, the cell unit 30 may be covered by the second case 210. Thus, such a battery module 2 may be provided in which the assembly is easy and the cell unit 30 may be prevented from being damaged at the time of assembly. Further, since the first case 110 and the second case 210 are respectively provided with a pair of side surfaces 112, 113; 212, 213, it is possible to suppress deformation at the time of falling.

Below, a modification of the above embodiment is described.

(First Modification)

Figure 11:
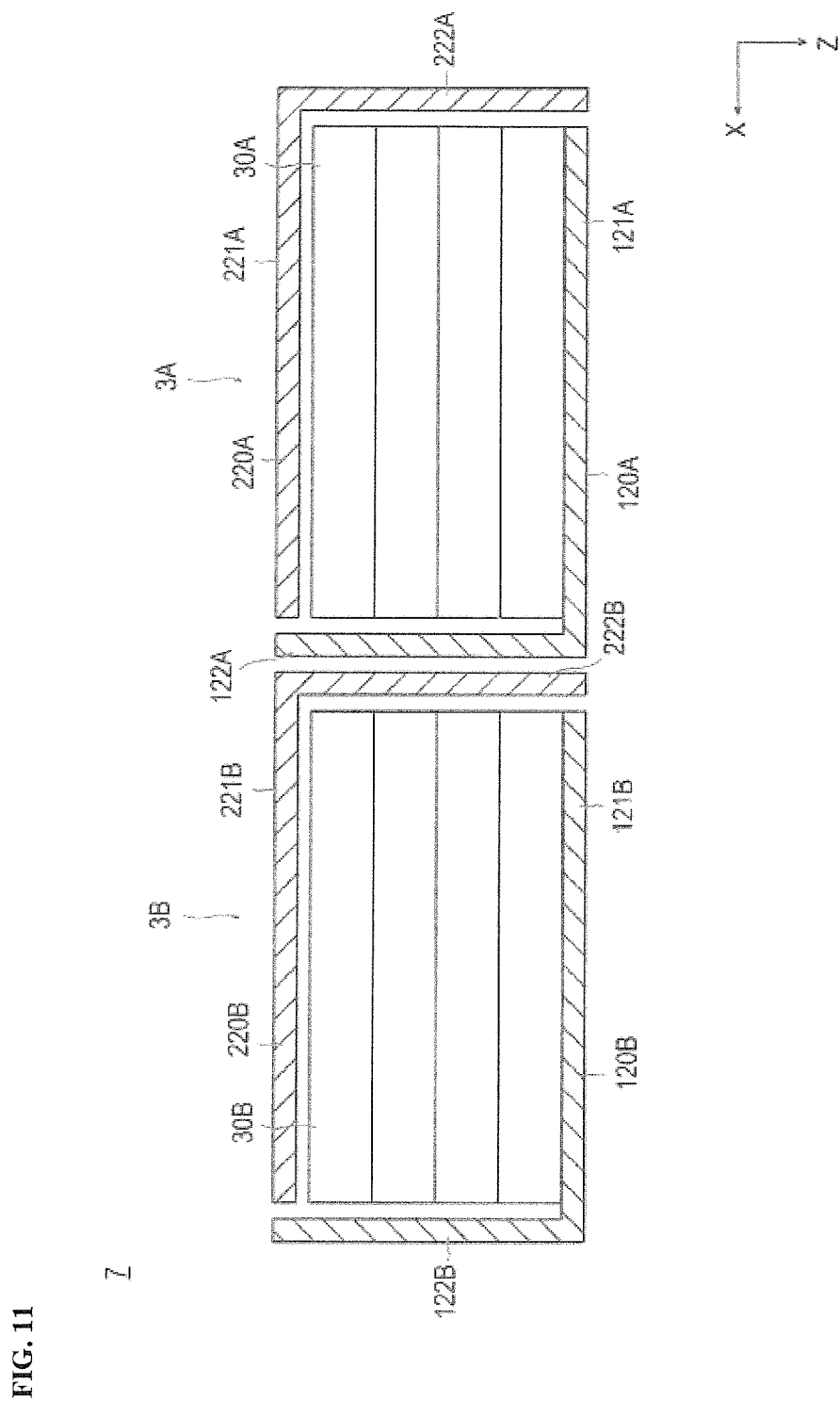
FIG. 11 is a schematic sectional view showing a battery pack pertaining to a first modification.

FIG. 11 is a schematic sectional view showing a battery pack 7 pertaining to a first modification. As shown in FIG. 11, the battery pack 7 is provided with battery modules 3 (3A, 3B), each including a cell unit 30 (30A, 30B) including four unit cells 10 (10A to 10D), a pair of first case 120 (120A, 120B) and second case 220 (220A, 220B) for enclosing to accommodate the cell unit 30. The first case 120 includes a main surface 121 (121A, 121B) and a side surface 122 (122A, 122B) bend at one end of the main surface 121 and extending in a direction away from the main surface 121. Further, the second case 220 includes a main surface 221 (221A, 221B) and a side surface 222 (222A, 22B) bent at one end of the main surface 221 and extending in a direction away from the main surface 221. The battery module 3 is laminated such that the side surface 122A of one battery module 3A is opposed to the side surface 222B of the other battery module 3B. In addition, Then, in extension in the X direction of the main surface 121A of the first case 120A of the one battery module 3A, the side surface 222B of the second case 220B of the other adjacent battery module 3B is arranged. According to this configuration, due to the heat flow that occurs at failure in the other battery modules 3B, when the side surface 222B of the second case 220B of the other battery modules 3B presses the one battery module 3A rightward in the X-direction, the main surface 121A of the first case 120A of the one battery module 3A supports the side surface 222B of the second case 220B of the other battery module 3B. Therefore, the deformation of the second case 220B of the other battery modules 3B can be suppressed.

(Second Modification)

Figure 12:
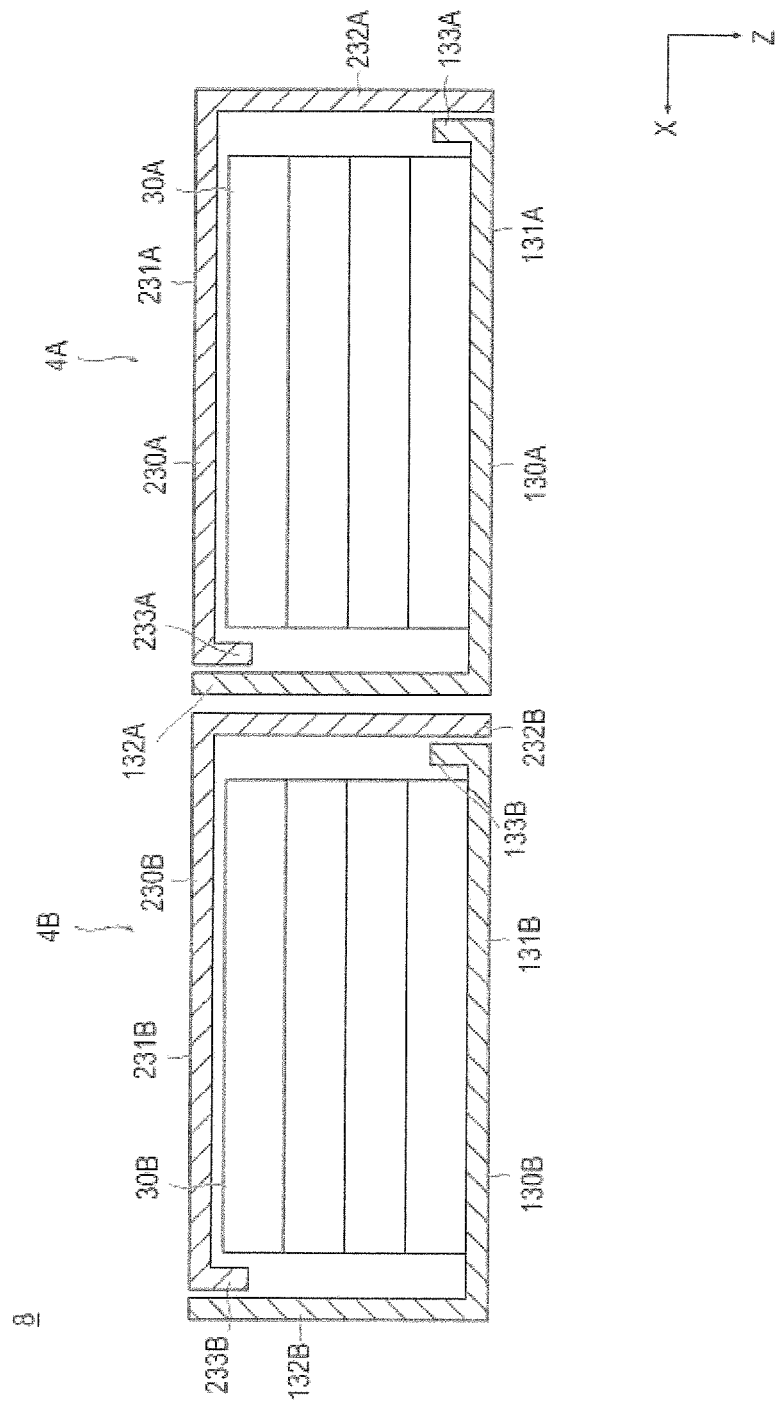
FIG. 12 is a schematic sectional view showing a battery pack pertaining to a second modification.

FIG. 12 is a schematic sectional view showing a battery pack 8 pertaining to the second modification. As shown in FIG. 12, the battery pack 8 pertaining to the second modification 2 includes battery modules 4 (4A, 4B), each including four unit cells 10 (10A to 10D) cell units 30 (30A, 30B), a pair of first case 130 (130A, 130B) and second case 230 (230A, 230B) for enclosing to accommodate the cell unit 30. The first case 130 is provided with a main surface 131 (131A, 131B) and a pair of side surfaces 132 (132A, 132B), 133 (133A, 133B) bent at both ends of the main surface 131 and extending with different lengths in a direction away from the main surface 131. The side surfaces 132, 232 are formed with the extension length longer than the side surfaces 133, 233. The battery module 4 is laminated such that the side surface 132A of one battery module 4A and the side surface 232A of the other battery module 4B are opposed to each other. Then, in extension in the X direction of the main surface 131A of the first case 130A of the one battery module 4A, the side surface 232B of the second case 230B of the other adjacent battery module 4B is arranged. According to this configuration, due to the heat flow that occurs at failure in the other battery modules 4B, when the side surface 232B of the second case 230B of the other battery modules 4B presses the one battery module 4A rightward in the X-direction, the main surface 131A of the first case 130A of the one battery module 4A supports the side surface 232B of the second case 230B of the other battery module 4B. Therefore, the deformation of the second case 230B of the other battery modules 4B can be suppressed.

(Third Modification)

Figure 13:
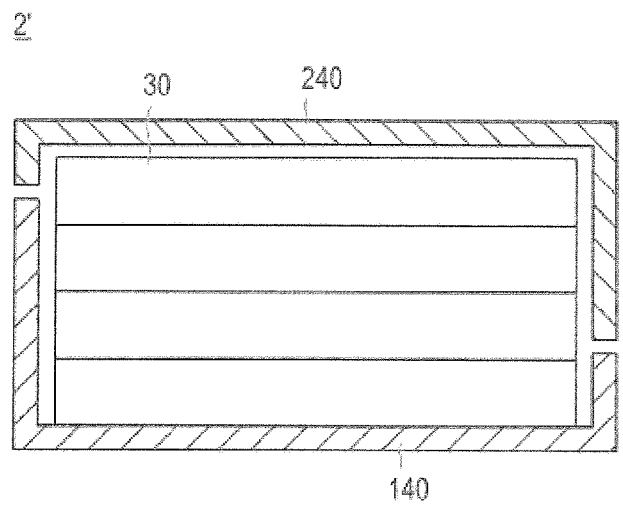
FIG. 13 is a schematic sectional view showing a battery module pertaining to a third modification.

FIG. 13 is a schematic cross-sectional view showing a battery module 2 pertaining to a third modification. In the first and second embodiments, the first case 100, 110 and the second case 200, 210 are of the same shape. However, as shown in FIG. 13, the first case 140 and the second case may have a different shape.

(Fourth Modification)

Figure 14:
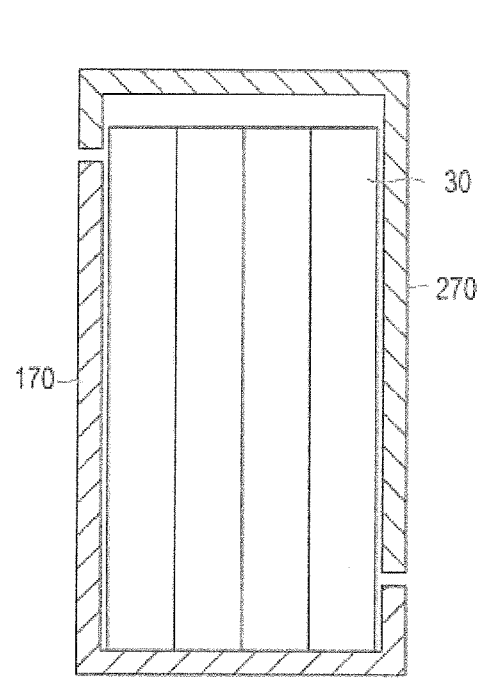
FIG. 14 is a schematic sectional view showing a battery module pertaining to a fourth modification 4.

FIG. 14 is a schematic cross-sectional view showing a battery module 3 pertaining to a fourth modification. In the first and second embodiments, the first case 100, 110, and the second case 200, 210 are configured to be assembled in a "laid-down" state. However, as shown in FIG. 14, the first case 170 and second case 270 may be configured to be assembled in an "upright or standing" state.

The invention claimed is:

1. A battery module, comprising:
   a cell unit having at least one unit cell;
   first and second cases to enclose and accommodate four sides of the cell unit, each of the first and second cases having a main surface and a pair of side surfaces bent at both ends of the main surface and extending in a direction away from the main surface, one of the pair of side surfaces having a first extension length and the other of the pair of side surfaces having a second extension length different from the first extension length, wherein each of the main surfaces of the first case and the second case is formed with a first through hole in each corner of the main surface;
   a spacer, provided at and fixed to a respective end of the cell unit, and formed with a second through hole at each longitudinal end of the spacer, such that when the cell unit is aligned with the first and second cases, each of the first through holes of the first case align with a respective second through hole of the spacer and a respective first through hole of the second case; and
   a fastener inserted into each of the first through holes and respective aligned through hole to thereby fasten the first case, the cell unit, and the second case.

2. The battery module as claimed in claim 1, wherein the first case and the second case are of the same shape.

3. The battery module of claim 1, wherein both of the first extension length and the second extension length are less than a thickness of the cell unit such that a gap is formed between distal ends of one side surface of the first case a distal end of an adjacent side surface of the second case covering a same side of the cell unit.

4. The battery module of claim 1, wherein the first extension length is substantially the same as a thickness of the cell unit and the second extension length is less than the thickness of the cell unit such that when the first case and the second case are arranged to cover the unit cell, one side of the first case and one side of the second case overlap and the other side of the first case and the other side of the second case overlap.

* * * * *